United States Patent
Lian et al.

(10) Patent No.: US 10,899,219 B2
(45) Date of Patent: Jan. 26, 2021

(54) POWER DRIVE SYSTEM AND VEHICLE

(71) Applicant: BYD COMPANY LIMITED, Guangdong (CN)

(72) Inventors: Yubo Lian, Shenzhen (CN); Heping Ling, Shenzhen (CN); Zhen Zhai, Shenzhen (CN); Youbin Xu, Shenzhen (CN)

(73) Assignee: BYD COMPANY LIMITED

( * ) Notice: Subject to any disclaimer, the term of this patent is extended or adjusted under 35 U.S.C. 154(b) by 24 days.

(21) Appl. No.: 16/314,008

(22) PCT Filed: May 11, 2017

(86) PCT No.: PCT/CN2017/084030
§ 371 (c)(1),
(2) Date: Dec. 28, 2018

(87) PCT Pub. No.: WO2018/000965
PCT Pub. Date: Jan. 4, 2018

(65) Prior Publication Data
US 2019/0322165 A1   Oct. 24, 2019

(30) Foreign Application Priority Data

Jun. 29, 2016  (CN) .......................... 2016 2 0679161

(51) Int. Cl.
*B60K 6/36*     (2007.10)
*B60K 17/16*    (2006.01)
(Continued)

(52) U.S. Cl.
CPC ................ *B60K 6/36* (2013.01); *B60K 17/20* (2013.01); *B60K 6/547* (2013.01);
(Continued)

(58) Field of Classification Search
CPC ...................................................... B60K 6/36
See application file for complete search history.

(56) References Cited

U.S. PATENT DOCUMENTS

| | | |
|---|---|---|
| 9,168,918 B2 | 10/2015 | Lee et al. |
| 2008/0000312 A1 | 1/2008 | Lang et al. |

(Continued)

FOREIGN PATENT DOCUMENTS

| | | |
|---|---|---|
| AT | 553317 T | 4/2012 |
| CN | 102259583 A | 11/2011 |

(Continued)

OTHER PUBLICATIONS

International Application No. PCT/CN2017/084030, International Search Report and Written Opinion dated Aug. 16, 2017.

*Primary Examiner* — Brian L Swenson

(57) ABSTRACT

The present disclosure discloses a power drive system and a vehicle, the power drive system including: an engine; a plurality of input shafts, the engine being configured to be selectively engaged with at least one of the plurality of input shafts each provided with a gear driving gear; a plurality of output shafts each provided with a gear driven gear, a plurality of gear driven gears being meshed with a plurality of gear driving gears respectively; a reverse shaft provided with a first gear for the reverse shaft, the first gear for the reverse shaft being meshed with one of the gear driving gears; a reverse output gear linked with the reverse shaft; and a first electric generator, the first electric generator and the plurality of output shafts linked with a differential power input gear of the vehicle respectively.

17 Claims, 7 Drawing Sheets

(51) Int. Cl.
    *B60L 53/14* (2019.01)
    *B60K 6/547* (2007.10)
    *B60K 6/48* (2007.10)

(52) U.S. Cl.
    CPC ............. *B60K 2006/4808* (2013.01); *B60K 2006/4833* (2013.01); *B60L 53/14* (2019.02)

(56) References Cited

U.S. PATENT DOCUMENTS

| | | | |
|---|---|---|---|
| 2011/0269599 A1* | 11/2011 | Nakasako | B60W 20/00 477/5 |
| 2011/0290072 A1 | 12/2011 | Xie et al. | |
| 2012/0222518 A1 | 9/2012 | Ogino et al. | |
| 2014/0157923 A1 | 6/2014 | Lee et al. | |
| 2015/0184731 A1 | 7/2015 | Lee et al. | |
| 2016/0207392 A1 | 7/2016 | Zhang et al. | |

FOREIGN PATENT DOCUMENTS

| | | |
|---|---|---|
| CN | 202180738 U | 4/2012 |
| CN | 102667240 A | 9/2012 |
| CN | 103465776 A | 12/2013 |
| CN | 103867657 A | 6/2014 |
| CN | 104773063 A | 7/2015 |
| CN | 206086345 U | 4/2017 |
| DE | 102004050757 A1 | 4/2006 |
| DE | 102013113477 A1 | 6/2014 |
| EP | 2068041 A1 | 10/2009 |
| EP | 2390127 A1 | 11/2011 |
| JP | 2008516827 A | 5/2008 |
| JP | 4426624 B2 | 3/2010 |
| JP | 2010285062 A | 12/2010 |
| JP | 2014114954 A | 6/2014 |
| JP | 6234779 B2 | 11/2017 |
| KR | 101362059 B1 | 2/2014 |
| WO | 2006040150 A1 | 4/2006 |
| WO | 2009121543 A1 | 10/2009 |

* cited by examiner

POWER DRIVE SYSTEM AND VEHICLE

CROSS REFERENCE TO RELATED APPLICATIONS

The present application is a national phase application of International Patent Application No. PCT/CN2017/084030, filed on May 11, 2017, which claims priority to and benefits of Chinese Patent Application No. 201620679161.2, filed on Jun. 29, 2016. The contents of the above-referenced applications are incorporated herein by reference in their entirety.

TECHNICAL FIELD

The present disclosure relates to the technical field of automobiles, and in particular to a power drive system and a vehicle.

BACKGROUND

With the increasing consumption of resources, the development and utilization of new energy vehicles have become an increasing tendency. As one of the new energy vehicles, a hybrid electric vehicle is driven by an engine and/or a motor, has a plurality of driving modes, and thus may improve transmission efficiency and fuel economy.

However, in related technologies learned by the inventor, a transmission in the hybrid electric vehicle has a complex structure, less transmission modes, and lower transmission efficiency in a pure-electric mode.

SUMMARY

The present disclosure aims at resolving one of technical problems in related technologies to some extent. To this end, the present disclosure provides a power drive system, which has high transmission efficiency in a pure-electric mode.

The present disclosure further provides a vehicle.

The power drive system according to the present disclosure includes: an engine; a plurality of input shafts, the engine being configured to be selectively engaged with at least one of the plurality of input shafts each provided with a gear driving gear; a plurality of output shafts each provided with a gear driven gear, a plurality of gear driven gears being meshed with a plurality of gear driving gears correspondingly; a reverse shaft provided with a first gear for the reverse shaft, the first gear for the reverse shaft being meshed with one of the gear driving gears; a reverse output gear linked with the reverse shaft; and a first electric generator, the first electric generator and the plurality of output shafts linked with a differential power input gear of the vehicle respectively.

In the power drive system according to the present disclosure, since the first electric generator is linked with the differential power input gear, the first electric generator has very high transmission efficiency, and this may avoid the problem that a pure-electric mode may be achieved only by complex gear shift and transmission chains in a transmission in a traditional power drive system, so that the pure-electric mode has less components required for transmission, with reliable transmission processes and high transmission efficiency. Additionally, for control logics, a control logic of the engine and a control logic of the first electric generator are independent of each other, which may save the time and cost of development for manufacturers and avoid higher malfunction rates of the power drive system.

Additionally, the power drive system according to the present disclosure may also have the following distinguishing technical features.

In some examples of the present disclosure, the first gear for the reverse shaft is sheathed on the reverse shaft.

In some examples of the present disclosure, the power drive system further includes: a first synchronizer for the reverse shaft configured to engage the reverse shaft with the first gear for the reverse shaft.

In some examples of the present disclosure, the reverse output gear is fixed on one of the output shafts.

In some examples of the present disclosure, the first gear for the reverse shaft is fixed on the reverse shaft.

In some examples of the present disclosure, the reverse output gear is sheathed on one of the output shafts and the reverse output gear is configured to be engageable with the one of the output shafts.

In some examples of the present disclosure, the power drive system further includes: a reverse-gear synchronizer configured to engage the reverse output gear with the one of the output shafts.

In some examples of the present disclosure, the reverse output gear shares the reverse-gear synchronizer with an adjacent gear driven gear.

In some examples of the present disclosure, the reverse shaft is fixedly provided with a first motor gear, the first motor gear linked with the first electric generator.

In some examples of the present disclosure, the first electric generator is configured to be linked with the differential power input gear by being linked with the reverse output gear.

In some examples of the present disclosure, the reverse shaft is fixedly provided with a second gear for the reverse shaft, the second gear for the reverse shaft meshed with the reverse output gear.

In some examples of the present disclosure, the power drive system further includes: a second electric generator configured to be linked with the engine.

In some examples of the present disclosure, the power drive system further includes: a dual clutch having an input end, a first output end, and a second output end, the input end being selectively engaged with at least one of the first output end and the second output end, and the engine being connected with the input end.

In some examples of the present disclosure, the input end is provided with external teeth for the input end, with which the second electric generator is linked.

In some examples of the present disclosure, the plurality of input shafts includes: a first input shaft and a second input shaft sheathed on the first input shaft, the first input shaft being connected with the first output end, and the second input shaft being connected with the second output end; and the plurality of output shafts includes: a first output shaft and a second output shaft.

In some examples of the present disclosure, the first input shaft is fixedly provided with a first-gear driving gear, a third- and fifth-gear driving gear, and a seventh-gear driving gear, and the second input shaft is fixedly provided with a second-gear driving gear and a fourth- and sixth-gear driving gear; the first output shaft is sheathed with a first-gear driven gear, a second-gear driven gear, a third-gear driven gear, and a fourth-gear driven gear; the second output shaft is sheathed with a fifth-gear driven gear, a sixth-gear driven gear, and a seventh-gear driven gear; and the first output shaft is provided with a first- and third-gear synchronizer located between the first-gear driven gear and the third-gear driven gear, the first output shaft is also provided with a second- and fourth-gear synchronizer located between the second-gear driven gear and the fourth-gear driven gear, the second output shaft is provided with a fifth- and seventh-gear synchronizer located between the fifth-gear driven gear and the seventh-gear driven gear, and the second output shaft is also provided with a sixth-gear synchronizer located on one side of the sixth-gear driven gear.

In some examples of the present disclosure, the first gear for the reverse shaft is meshed with the first-gear driving gear.

In some examples of the present disclosure, the reverse output gear is fixedly arranged on the second output shaft; and the first gear for the reverse shaft is sheathed on the reverse shaft, and the reverse shaft is provided with the first synchronizer for the reverse shaft that is used to be engaged with the first gear for the reverse shaft, wherein the first synchronizer for the reverse shaft shares the same shifting yoke mechanism with the sixth-gear synchronizer, the sixth-gear synchronizer is separated from the sixth-gear driven gear when the shifting yoke mechanism drives the first synchronizer for the reverse shaft to be engaged with the first gear for the reverse shaft, and the first synchronizer for the reverse shaft is separated from the first gear for the reverse shaft when the shifting yoke mechanism drives the sixth-gear synchronizer to be engaged with the sixth-gear driven gear.

In some examples of the present disclosure, the first gear for the reverse shaft is fixed on the reverse shaft; and the reverse output gear is sheathed on the second output shaft and adjacent to the sixth-gear driven gear, and the reverse output gear shares the sixth-gear synchronizer with the sixth-gear driven gear.

In some examples of the present disclosure, the first output shaft is fixedly provided with a first-output-shaft output gear, the second output shaft is fixedly provided with a second-output-shaft output gear, and the first-output-shaft output gear and the second-output-shaft output gear are meshed with the differential power input gear of the vehicle respectively.

The vehicle according to the present disclosure includes the described power drive system.

The vehicle and the power drive system have the same beneficial effects, which will not be described here in detail.

DETAILED DESCRIPTION

Embodiments of the present disclosure are described in detail below. Examples of the embodiments are illustrated in the accompanying drawings. The embodiments described below with reference to the accompanying drawings are exemplary, and are used for explaining rather than limiting the present disclosure.

A power drive system 100 according to embodiments of the present disclosure is described below in detail in combination with FIG. 1 to FIG. 7, and the power drive system 100 is applicable to vehicles such as hybrid electric vehicles and provides sufficient power and electric energy for normal driving of the vehicle as a power system of the vehicle.

The power drive system 100 according to the embodiments of the present disclosure mainly includes two major parts, one may be a power source, which may be an engine 4, an electric generator or the like, and the other may be a transmission (including a plurality of input shafts, a plurality of output shafts, gear pairs, etc.), which is used to implement a function of performing speed shifting on power output by the power source so as to satisfy a travelling requirement or a charging requirement or the like for the vehicle.

For example, in some embodiments, as shown in FIG. 1 to FIG. 7, the power drive system 100 may include an engine 4, a first electric generator 51, and a transmission, but is not limited thereto.

Figure 1:
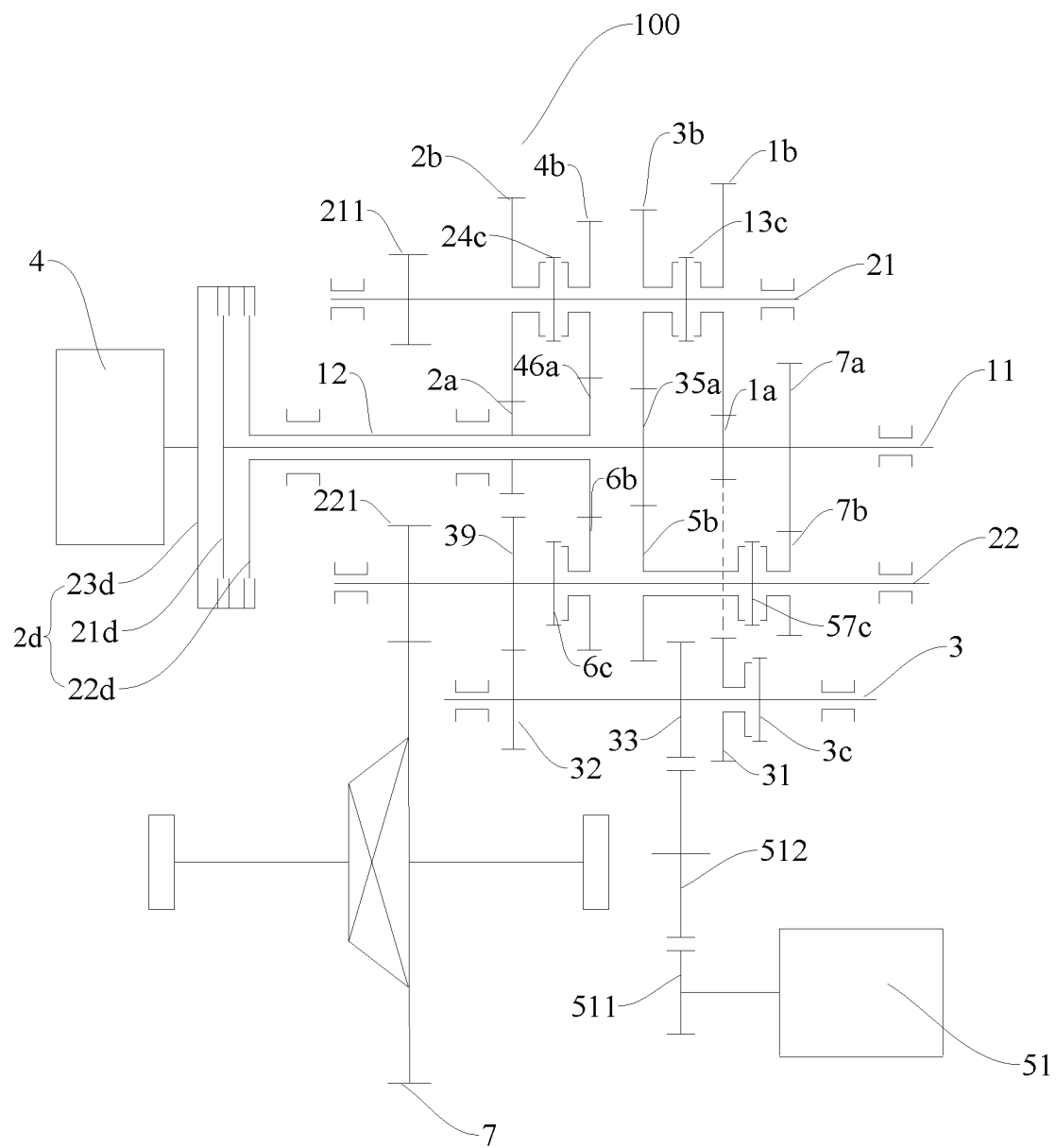
FIG. 1 is a schematic diagram of a power drive system according to an embodiment of the present disclosure.

As shown in combination with FIG. 1, in some embodiments, the transmission mainly includes a plurality of input shafts (for example, a first input shaft 11, a second input shaft 12), a plurality of output shafts (for example, a first output shaft 21, a second output shaft 22), a reverse shaft 3, and related gears as well as gear shift elements (such as synchronizers) on various shafts.

When power transfer is performed between the engine 4 and the input shafts, the engine 4 is configured to be selectively engaged with at least one of the plurality of input shafts. In other words, when the engine 4 transmits power to the input shafts, the engine 4 can be selectively engaged with one of the plurality of input shafts so as to transmit power, or the engine 4 can also be selectively engaged with two or more of the plurality of input shafts simultaneously so as to transmit power.

For example, in examples of FIG. 1 to FIG. 7, the plurality of shafts may include two input shafts, that is, a first input shaft 11 and a second input shaft 12, and the engine 4 can be selectively engaged with one of the first input shaft 11 and the second input shaft 12 so as to transmit power. Or, in particular, the engine 4 can also be engaged with the first input shaft 11 and the second input shaft 12 simultaneously so as to transmit power. Of course, it should be understood that the engine 4 may also be disengaged from the first input shaft 11 and the second input shaft 12 simultaneously.

For a person of ordinary skill in the art, an engagement state of the engine 4 with the input shafts is related to specific working conditions of the power drive system 100, which will be described below in detail in combination with specific embodiments and will not be described here in detail.

Transmission may be performed between the input shafts and the output shafts through gear pairs. For example, each of the input shafts is provided with a gear driving gear, each of the output shafts is provided with a gear driven gear, and a plurality of gear driven gears are meshed with a plurality of gear driving gears correspondingly, so as to constitute a plurality of gear pairs of different speed ratios.

In some embodiments of the present disclosure, the power drive system 100 may have seven forward gear pairs, that is, a first gear pair, a second gear pair, a third gear pair, a fourth gear pair, a fifth gear pair, a sixth gear pair, and a seventh gear pair, and the power drive system 100 also has a reverse gear pair.

The reverse shaft 3 and a reverse output gear 39 mainly have the following two arrangement forms. As shown in FIG. 1 to FIG. 4, the reverse shaft 3 is sheathed with a first gear for the reverse shaft 31 which can be engaged with the reverse shaft 3, in other words, transmission may be performed between the reverse shaft 3 and the first gear for the reverse shaft 31. As shown in FIG. 1 to FIG. 4, the reverse shaft 3 may also be provided with a first synchronizer for the reverse shaft 3c, which is used to engage the reverse shaft 3 with the first gear for the reverse shaft 31. When the first synchronizer for the reverse shaft 3c is used to engage the reverse shaft 3 with the first gear for the reverse shaft 31, transmission is performed between the reverse shaft 3 and the first gear for the reverse shaft 31. The reverse output gear 39 is linked with the reverse shaft 3. As shown in FIG. 1 to FIG. 4, the reverse shaft 3 may be fixedly provided with a second gear for the reverse shaft 32, which is meshed with the reverse output gear 39. The reverse output gear 39 may be fixed on one of the output shafts. As shown in FIG. 1 to FIG. 4, the reverse output gear 39 is fixed on the second output shaft 22, so that the reverse output gear 39 may be arranged in a reasonable position, thus further reducing the volume of the power drive system 100.

It should be explained that the above "linked" may be construed as a plurality of components (for example, two) moving in an associated manner, and taking two components linked as an example, one component moves while the other component also moves therewith. For example, in some embodiments of the present disclosure, the feature that a gear is linked with a shaft may be construed as follows: when the gear rotates, the shaft linked therewith will also rotate, or when the shaft rotates, the gear linked therewith will also rotate.

In another example, the feature that one shaft is linked with another shaft may be construed as follows: when one of the shafts rotates, the other shaft linked therewith will also rotate.

In still another example, the feature that a gear is linked with a gear may be construed as follows: when one of the gears rotates, the other gear linked therewith will also rotate.

In the following description of the present disclosure related to "linked", it is construed as such, unless specially explained.

Figure 5:
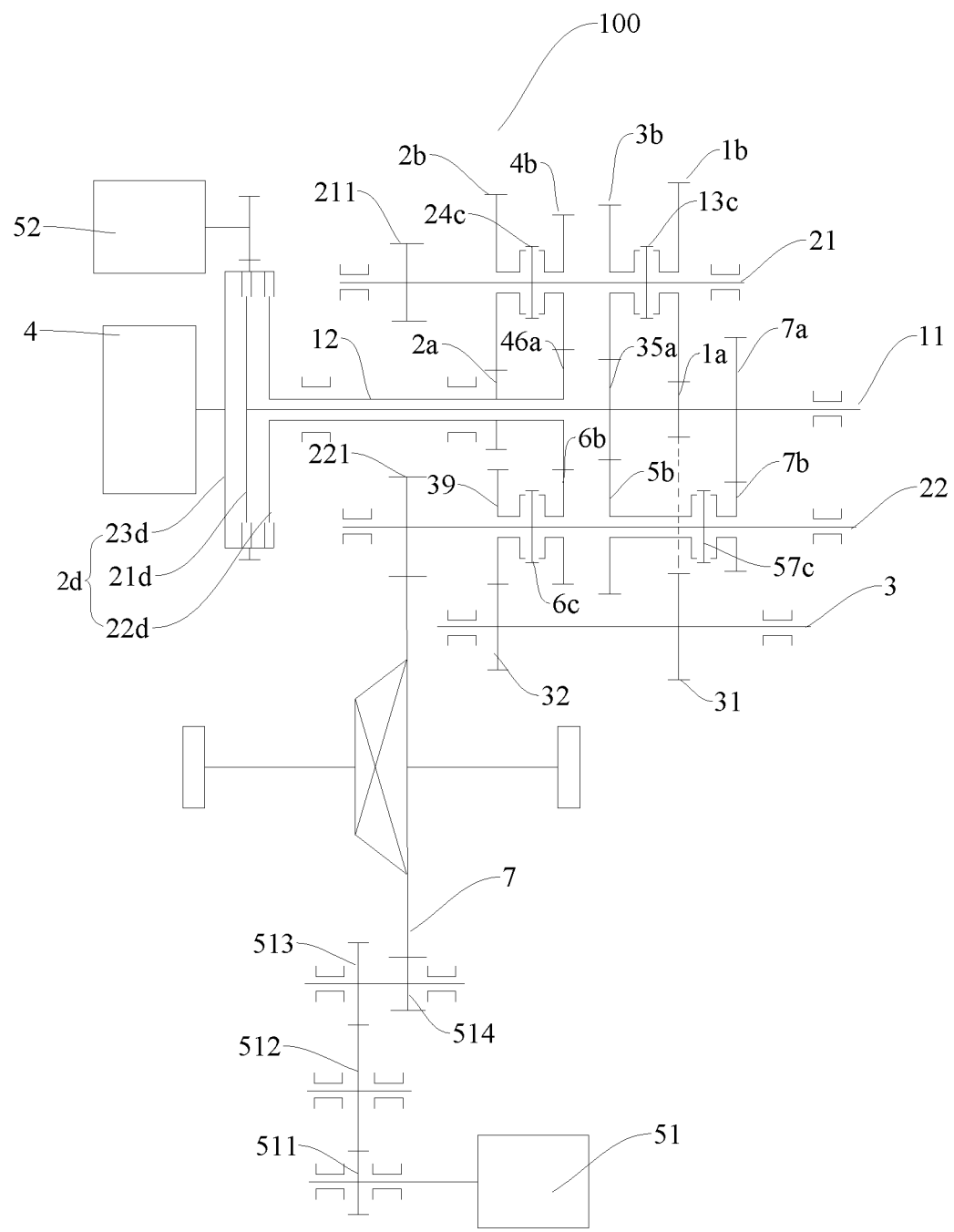
FIG. 5 is a schematic diagram of a power drive system according to still another embodiment of the present disclosure.
Figure 6:
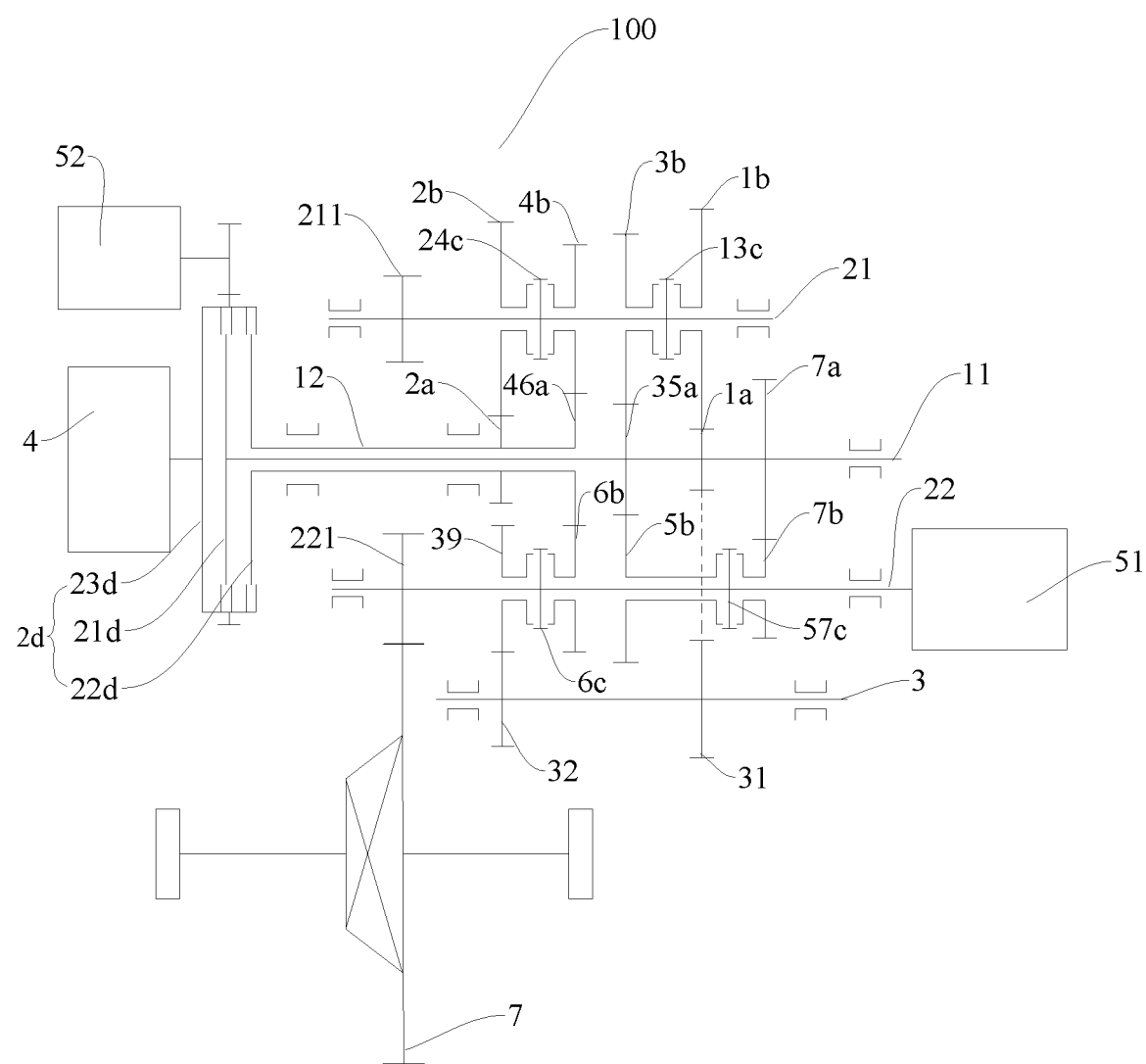
FIG. 6 is a schematic diagram of a power drive system according to still another embodiment of the present disclosure.
Figure 7:
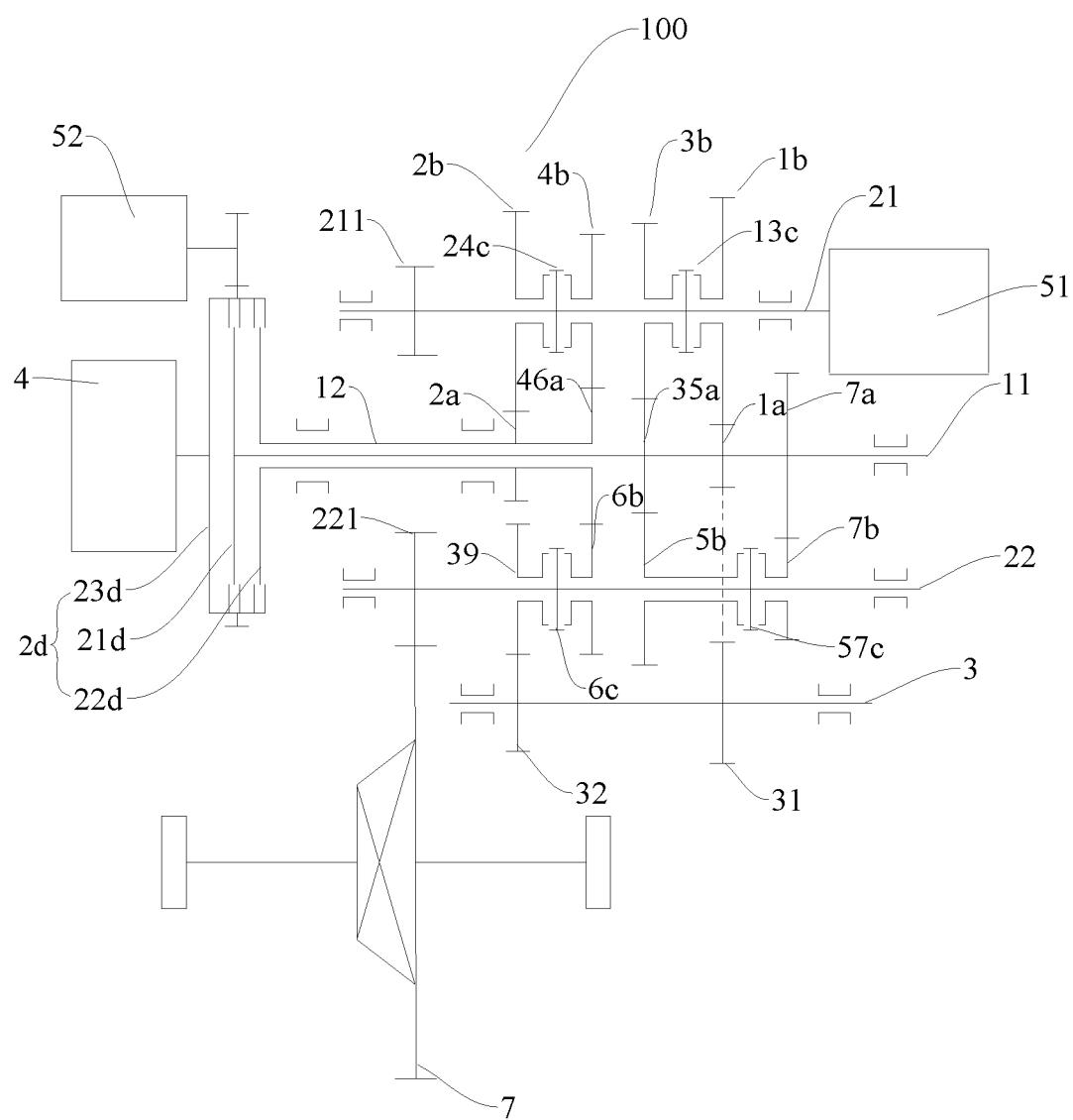
FIG. 7 is a schematic diagram of a power drive system according to still another embodiment of the present disclosure.

As shown in FIG. 5 to FIG. 7, the first gear for the reverse shaft 31 may also be fixedly arranged on the reverse shaft 3, at this point, the reverse output gear 39 may be sheathed on one of the output shafts (for example, the second output shaft 22), and the reverse output gear 39 is configured to be engageable with the output shaft. Specifically, the output shaft is also provided with a reverse-gear synchronizer (for example, a sixth-gear synchronizer 6c) that is used to be engaged with the reverse output gear 39, in other words, the reverse-gear synchronizer may be used to engage the reverse output gear 39 with the output shaft, so that the output shaft and the reverse output gear 39 can rotate synchronously, and thus reverse-gear power can be output from the output shaft. Preferably, as shown in FIG. 5 to FIG. 7, the reverse output gear 39 shares the reverse-gear synchronizer with an adjacent gear driven gear (for example, a sixth-gear driven gear 6b). Therefore, this may decrease parts and components of the power drive system 100, enable the axial length of the power drive system 100 to be smaller and reduce the volume of the power drive system 100.

The first gear for the reverse shaft 31 is meshed with one of the gear driving gears, for example, as shown in FIG. 1, the first gear for the reverse shaft 31 is meshed with a first-gear driving gear 1a, so that the first gear for the reverse shaft 31 together with the first-gear driving gear 1a constitutes a reverse gear pair, and power may be transferred between the reverse shaft 3 and the input shafts.

Figure 2:
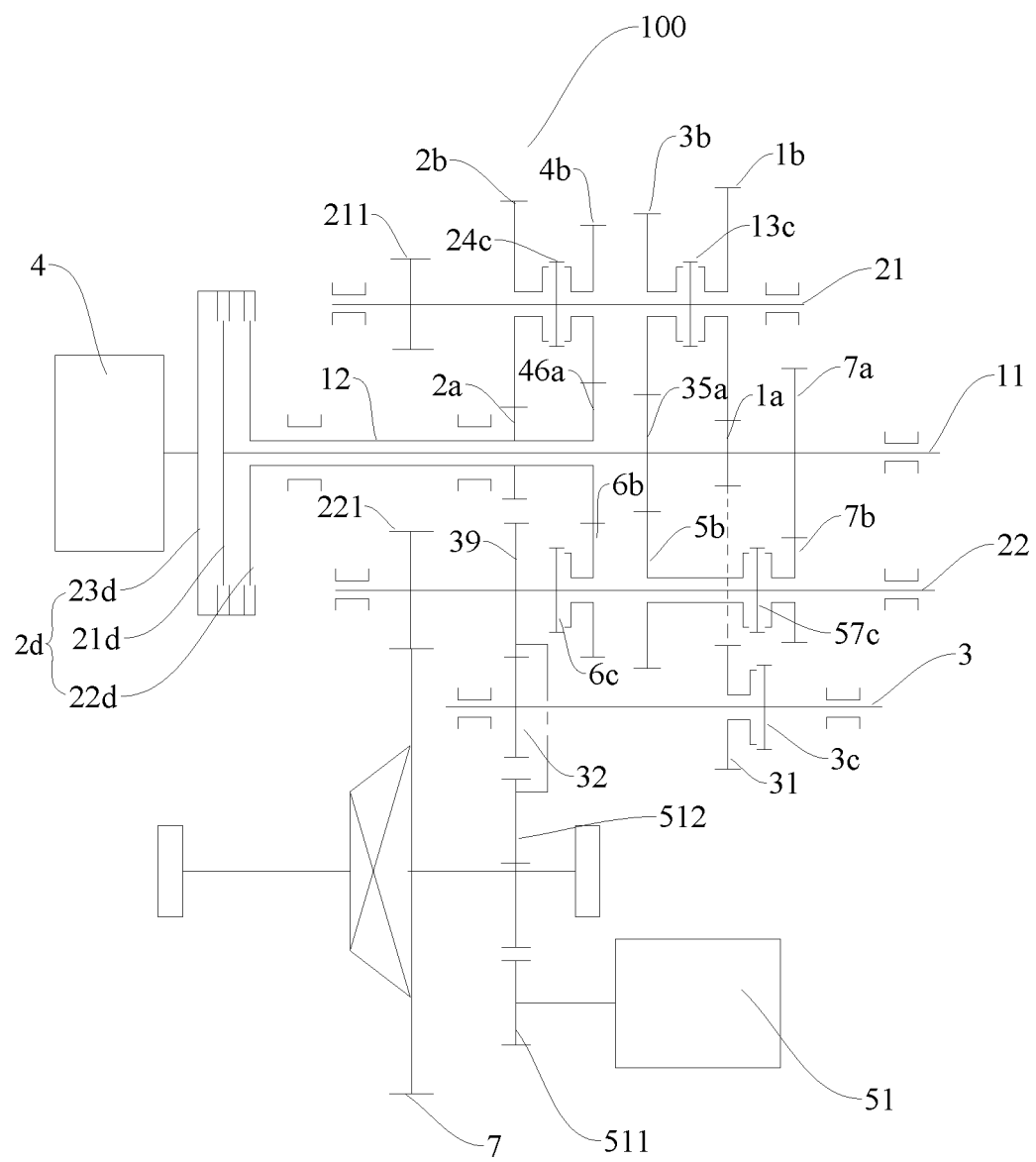
FIG. 2 is a schematic diagram of a power drive system according to another embodiment of the present disclosure.

There are a plurality of electric generators and arrangement forms thereof, for example, as shown in FIG. 1 and FIG. 2, the power drive system 100 only has the first electric generator 51 therein, and as shown in FIG. 3 to FIG. 7, the power drive system 100 has the first electric generator 51 and a second electric generator 52 therein.

There are a plurality of arrangement forms of the first electric generator 51, and specific arrangement forms of the first electric generator 51 are described below in detail in combination with FIG. 1 to FIG. 7.

The first electric generator 51 is linked with a differential power input gear 7 of the vehicle. In other words, power transfer may be performed between the first electric generator 51 and the differential power input gear 7 of the vehicle, when the first electric generator 51 is used as a motor, power of the first electric generator 51 may be transferred to a wheel through the differential power input gear 7 so as to drive the vehicle to move, and when the first electric generator 51 is used as a generator, energy transferred from the wheel may be transferred to the first electric generator 51 through the differential power input gear 7 so as to enable the first electric generator 51 to generate electricity.

A plurality of output shafts are linked with the differential power input gear 7 of the vehicle, wherein each of the output shafts is provided with an output gear, and the output gear is meshed with the differential power input gear 7, for example, as shown in FIG. 1 to FIG. 7, the plurality of output shafts includes a first output shaft 21 and a second output shaft 22, the first output shaft 21 is fixedly provided with a first-output-shaft output gear 211, the second output shaft 22 is fixedly provided with a second-output-shaft output gear 221, and the first-output-shaft output gear 211 and the second-output-shaft output gear 221 are meshed with the differential power input gear 7 of the vehicle respectively. Therefore, power transferred from the engine 4 may be transferred to the differential power input gear 7 through the first-output-shaft output gear 211 on the first output shaft 21, the power transferred from the engine 4 may also be transferred to the differential power input gear 7 through the second-output-shaft output gear 221, or the power transferred from the engine 4 may also be transferred to the differential power input gear 7 through the output gears of the two output shafts mentioned above.

Figure 4:
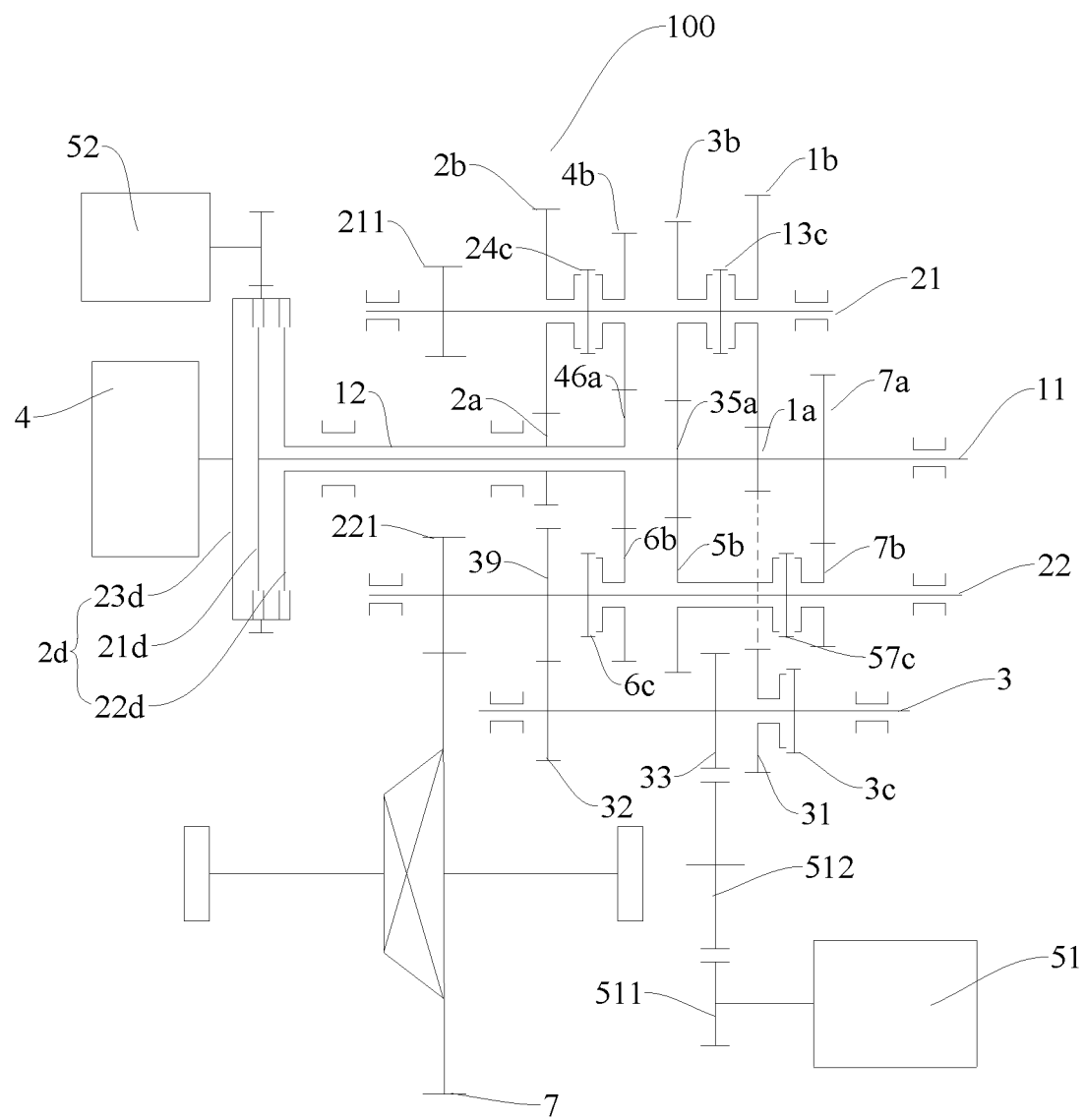
FIG. 4 is a schematic diagram of a power drive system according to still another embodiment of the present disclosure.

As shown in FIG. 1 and FIG. 4, the first electric generator 51 is linked with the reverse shaft 3, which is linked with the second output shaft 22 through the reverse output gear 39, so that the first electric generator 51 may be linked with the differential power input gear 7. Specifically, the reverse shaft 3 is also fixedly provided with a first motor gear 33, and transmission is performed between the first electric generator 51 and the first motor gear 33 through a first transmission gear 511 and a second transmission gear 512, wherein the first transmission gear 511 is fixed on a generator shaft of the first electric generator 51, and the second transmission gear 512 is meshed between the first transmission gear 511 and the first motor gear 33.

Accordingly, the first electric generator 51 is connected with the transmission directly through the first motor gear 33 by means of power coupling, and the power of the first electric generator 51 is output to the differential power input gear 7 through the transmission, that is, the first electric generator 51 is linked with the transmission directly through the first motor gear 33, and the first electric generator 51 is linked with the differential power input gear 7 indirectly through the transmission.

Figure 3:
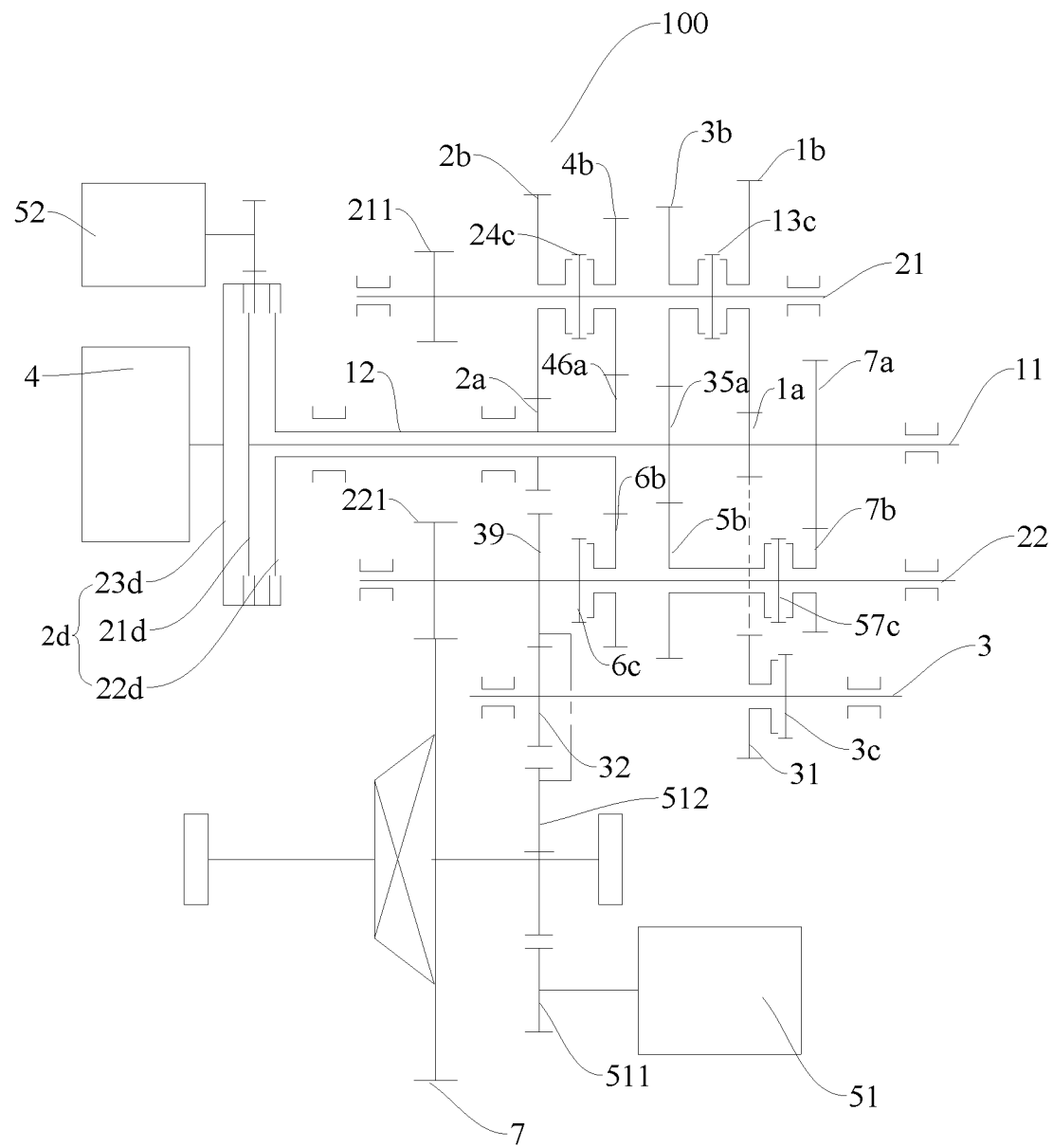
FIG. 3 is a schematic diagram of a power drive system according to a further embodiment of the present disclosure.

As shown in FIG. 2 and FIG. 3, the first electric generator 51 is configured to be linked with the differential power input gear 7 by being linked with the reverse output gear 39. Transmission is performed between the first electric generator 51 and the reverse output gear 39 through the first transmission gear 511 and the second transmission gear 512, wherein the first transmission gear 511 is fixed on the generator shaft of the first electric generator 51, and the second transmission gear 512 is meshed between the first transmission gear 511 and the reverse output gear 39.

As shown in FIG. 5, the first electric generator 51 is configured to be linked with the differential power input gear 7 directly through a plurality of gears, the first transmission gear 511, the second transmission gear 512, a third transmission gear 513, and a fourth transmission gear 514 are provided between the first electric generator 51 and the differential power input gear 7, the first transmission gear 511 is fixed on the generator shaft of the first electric generator 51, and the second transmission gear 512 is meshed between the first transmission gear 511 and the third transmission gear 513, wherein the third transmission gear 513 and the fourth transmission gear 514 are axially and fixedly arranged, and the fourth transmission gear 514 is meshed with the differential power input gear 7.

As shown in FIG. 6 and FIG. 7, the first electric generator 51 may also be linked with one of the plurality of output shafts, as shown in FIG. 6, the first electric generator 51 is connected with the second output shaft 22, and as shown in FIG. 7, the first electric generator 51 is connected with the first output shaft 21. Accordingly, the differential power input gear 7 may be linked with the first electric generator 51 through one of the plurality of output shafts.

Arrangement forms of the second electric generator 52 are described below in detail in combination with FIG. 3 to FIG. 7, and as shown in FIG. 3 to FIG. 7, the second electric generator 52 is configured to be linked with the engine 4. When the second electric generator 52 is used as a motor, the second electric generator 52 may be used to initiate the engine 4, or the second electric generator 52 may be used to drive the wheel to rotate. When the second electric generator 52 is used as a generator, the engine 4 may drive the second electric generator 52 to generate electricity, and the energy transferred from the vehicle may drive, through the output shafts, the second electric generator 52 to generate electricity.

The power drive system 100 may further include a dual clutch 2d, which has an input end 23d, a first output end 21d, and a second output end 22d, the input end 23d is selectively engaged with at least one of the first output end 21d and the second output end 22d, and the engine 4 is connected with the input end 23d, wherein the first output end 21d is connected with the first output shaft 21, and the second output end 22d is connected with the second output shaft 22, and wherein the input end 23d is provided with external teeth for the input end, with which the second electric generator 52 is linked. Since the input end 23d is connected with the engine 4, the second electric generator 52 may be linked with the engine 4 through the input end 23d. A generator shaft of the second electric generator 52 may be fixedly provided with a transmission gear connected with the external teeth for the input end.

It should be understood that specific engagement states of the dual clutch 2d are affected by a control strategy, and for a person skilled in the art, the control strategy may be set adaptively according to a transmission mode required actually, so that switching may be performed between a plurality of modes as follows: the input end 23d is disengaged from the two output ends, and the input end 23d is engaged with at least one of the two output ends.

As shown in FIG. 1 to FIG. 7, the second input shaft 12 is sheathed on the first input shaft 11, which may enable the power drive system 100 to be compact in structure, effectively reduce the axial length of the power drive system 100, make the volume of the power drive system 100 be smaller, and facilitate the power drive system 100 being arranged on the vehicle.

As shown in FIG. 1 to FIG. 7, the first input shaft 11 may be provided with a first-gear driving gear 1a, a third- and fifth-gear driving gear 35a, and a seventh-gear driving gear 7a, the second input shaft 12 may be provided with a second-gear driving gear 2a and a fourth- and sixth-gear driving gear 46a, and each gear driving gear rotates synchronously with a respective input shaft.

Correspondingly, as shown in FIG. 1 to FIG. 7, the first output shaft 21 is provided with a first-gear driven gear 1b, a second-gear driven gear 2b, a third-gear driven gear 3b, and a fourth-gear driven gear 4b, the second output shaft 22 is provided with a fifth-gear driven gear 5b, a sixth-gear driven gear 6b, and a seventh-gear driven gear 7b, and each gear driven gear is sheathed on a respective output shaft, that is, each gear driven gear can rotate differentially relative to the corresponding output shaft.

The first-gear driven gear 1b is meshed with the first-gear driving gear 1a so as to constitute a first gear pair, the second-gear driven gear 2b is meshed with the second-gear driving gear 2a so as to constitute a second gear pair, the third-gear driven gear 3b is meshed with the third- and fifth-gear driving gear 35a so as to constitute a third gear pair, the fourth-gear driven gear 4b is meshed with the fourth- and sixth-gear driving gear 46a so as to constitute a fourth gear pair, the fifth-gear driven gear 5b is meshed with the third- and fifth-gear driving gear 35a so as to constitute a fifth gear pair, the sixth-gear driven gear 6b is meshed with the fourth- and sixth-gear driving gear 46a so as to constitute a sixth gear pair, the seventh-gear driven gear 7b is meshed with the seventh-gear driving gear 7a so as to constitute a seventh gear pair, and the first-gear driving gear 1a is meshed with the first gear for the reverse shaft 31 so as to constitute a reverse gear pair.

The fourth gear pair and the sixth gear pair share the fourth- and sixth-gear driving gear 46a, and the third gear pair and the fifth gear pair share the third- and fifth-gear driving gear 35a, which may decrease two gear driving gears, so that the power drive system 100 may be more compact in structure and smaller in axial dimension.

Since there is a sheathed structure between the driven gears and the output shafts, a synchronizer needs to be provided to synchronize corresponding driven gears and output shafts, so as to achieve the output of power.

In some embodiments, as shown in combination with FIG. 1 to FIG. 7, the power drive system 100 includes a first- and third-gear synchronizer 13c, a second- and fourth-gear synchronizer 24c, a fifth- and seventh-gear synchronizer 57c, and a sixth-gear synchronizer 6c.

As shown in FIG. 1, the first- and third-gear synchronizer 13c is arranged on the first output shaft 21 and located between the first-gear driven gear 1b and the third-gear driven gear 3b, and the first- and third-gear synchronizer 13c may engage the first-gear driven gear 1b or the third-gear driven gear 3b with the first output shaft 21, so that the driven gear and the output shaft can rotate synchronously.

For example, as shown in combination with FIG. 1, when an engagement sheath of the first- and third-gear synchronizer 13c moves left, the third-gear driven gear 3b may be engaged with the first output shaft 21, so that the third-gear driven gear 3b and the first output shaft 21 can rotate synchronously. The engagement sheath of the first- and third-gear synchronizer 13c moves right to engage the first-gear driven gear 1b with the first output shaft 21, so that the first-gear driven gear 1b and the first output shaft 21 can rotate synchronously.

As shown in FIG. 1, similarly, the second- and fourth-gear synchronizer 24c is arranged on the first output shaft 21 and located between the second-gear driven gear 2b and the fourth-gear driven gear 4b, and the second- and fourth-gear synchronizer 24c may engage the second-gear driven gear 2b or the fourth-gear driven gear 4b with the first output shaft 21, so that the driven gear and the output shaft can rotate synchronously.

For example, as shown in combination with FIG. 1, an engagement sheath of the second- and fourth-gear synchronizer 24c moves left to engage the second-gear driven gear 2b with the first output shaft 21, so that the second-gear driven gear 2b and the first output shaft 21 rotate synchronously. The engagement sheath of the second- and fourth-gear synchronizer 24c moves right to engage the fourth-gear driven gear 4b with the first output shaft 21, so that the fourth-gear driven gear 4b and the first output shaft 21 rotate synchronously.

As shown in FIG. 1, similarly, the fifth- and seventh-gear synchronizer 57c is arranged on the second output shaft 22, the fifth- and seventh-gear synchronizer 57c is located between the fifth-gear driven gear 5b and the seventh-gear driven gear 7b, and the fifth- and seventh-gear synchronizer 57c is used to engage the fifth-gear driven gear 5b or the seventh-gear driven gear 7b with the second output shaft 22, for example, an engagement sheath of the fifth- and seventh-gear synchronizer 57c moves right to engage the seventh-gear driven gear 7b with the second output shaft 22, so that the seventh-gear driven gear 7b and the second output shaft 22 rotate synchronously. In another example, the engagement sheath of the fifth- and seventh-gear synchronizer 57c moves left to engage the fifth-gear driven gear 5b with the second output shaft 22, so that the fifth-gear driven gear 5b and the second output shaft 22 rotate synchronously.

As shown in FIG. 1, similarly, the sixth-gear synchronizer 6c is arranged on the second output shaft 22, the sixth-gear synchronizer 6c is located on one side of the sixth-gear driven gear 6b, for example, on the left side, and the sixth-gear synchronizer 6c is used to engage the sixth-gear driven gear 6b with the second output shaft 22, for example, an engagement sheath of the sixth-gear synchronizer 6c moves right to engage the sixth-gear driven gear 6b with the second output shaft 22, so that the sixth-gear driven gear 6b and the second output shaft 22 rotate synchronously.

As shown in FIG. 5 to FIG. 7, the reverse output gear 39 and the sixth-gear driven gear 6b are arranged adjacent to each other so as to share the sixth-gear synchronizer 6c, so that the sixth-gear synchronizer 6c constitutes the reverse-gear synchronizer. As shown in combination with FIG. 5 to FIG. 7, the engagement sheath of the sixth-gear synchronizer 6c moves left to engage the reverse output gear 39, and it moves right to engage the sixth-gear driven gear 6b.

In some embodiments, as shown in FIG. 1, distances of the second-gear driving gear 2a, the fourth- and sixth-gear driving gear 46a, the third- and fifth-gear driving gear 35a, the first-gear driving gear 1a, and the seventh-gear driving gear 7a from the engine 4 increase gradually. Therefore, gears are arranged more reasonably, the power drive system 100 is more compact, and radial and axial dimensions are relatively smaller.

For a power drive system 100 with the reverse output gear 39 fixedly arranged on the second output shaft 22, the first gear for the reverse shaft 31 is sheathed on the reverse shaft 3, and the reverse shaft 3 is provided with a first synchronizer for the reverse shaft 3c that is used to be engaged with the first gear for the reverse shaft 31, wherein the sixth-gear synchronizer 6c is located on the left side of the sixth-gear driven gear 6b, and the first synchronizer for the reverse shaft 3c is located on the right side of the first gear for the reverse shaft 31, so that the first synchronizer for the reverse shaft 3c and the sixth-gear synchronizer 6c may share the same shifting yoke mechanism, the sixth-gear synchronizer 6c is separated from the sixth-gear driven gear 6b when the shifting yoke mechanism drives the first synchronizer for the reverse shaft 3c to be engaged with the first gear for the reverse shaft 31, and the first synchronizer for the reverse shaft 3c is separated from the first gear for the reverse shaft 31 when the shifting yoke mechanism drives the sixth-gear synchronizer 6c to be engaged with the sixth-gear driven gear 6b. Specifically, when the shifting yoke mechanism drives an engagement sheath to move left, the first synchronizer for the reverse shaft 3c is engaged with the first gear for the reverse shaft 31 and the sixth-gear synchronizer 6c is separated from the sixth-gear driven gear 6b, and when the shifting yoke mechanism drives the engagement sheath to move right, the sixth-gear synchronizer 6c is engaged with the sixth-gear driven gear 6b and the first synchronizer for the reverse shaft 3c is separated from the first gear for the reverse shaft 31. Therefore, one shifting yoke mechanism may be omitted for the power drive system 100, so that the power drive system 100 may be simple in structure and light in weight.

Working modes of the power drive system 100 according to the embodiments of the present disclosure are described below in detail by taking the power drive system 100 shown in FIG. 1 as an example.

A pure-engine mode: the transmission has seven forward gears, detailed description is made below by taking a first gear as an example, the input end 23d of the dual clutch 2d is connected with the first output end 21d, the first- and third-gear synchronizer 13c engages the first-gear driven gear 1b with the first output shaft 21, and power of the engine 4 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail. It should be explained that since the first electric generator 51 is linked with the reverse shaft 3, when the vehicle is in a reverse gear, the first electric generator 51 may be used as a generator so as to generate electricity.

A pure-electric mode: the first electric generator 51 is used as a motor, and power of the first electric generator 51 is transferred to the wheel through the first transmission gear 511, the second transmission gear 512, the first motor gear 33, the reverse shaft 3, second gear for the reverse shaft 32, the reverse output gear 39, the second output shaft 22, the second-output-shaft output gear 221, and the differential power input gear 7 in sequence so as to drive the vehicle to move.

A hybrid drive mode is a combination of the pure-engine mode and the pure-electric mode mentioned above, the power of the engine 4 is coupled with the power of the first electric generator 51 at the differential power input gear 7, and then the coupled power is transferred to the wheel to drive the vehicle to move.

An energy recovery mode: energy transferred from the wheel is transferred to the first electric generator 51 through the differential power input gear 7, the second-output-shaft output gear 221, the second output shaft 22, the reverse output gear 39, the second gear for the reverse shaft 32, the reverse shaft 3, the first motor gear 33, the second transmission gear 512, and the first transmission gear 511 in sequence, and at this point, the first electric generator 51 is used as a generator.

Working modes of the power drive system 100 according to the embodiments of the present disclosure are described below in detail by taking the power drive system 100 shown in FIG. 2 as an example.

A pure-engine mode: the transmission has seven forward gears, detailed description is made below by taking the first gear as an example, the input end 23*d* of the dual clutch 2*d* is connected with the first output end 21*d*, the first- and third-gear synchronizer 13*c* engages the first-gear driven gear 1*b* with the first output shaft 21, and the power of the engine 4 is transferred to the wheel through the first-gear driving gear 1*a*, the first-gear driven gear 1*b*, the first- and third-gear synchronizer 13*c*, the first output shaft 21, the first-output-shaft output gear 211, and the differential power input gear 7 in sequence so as to drive the vehicle to move. Other gear transfer processes are similar to that of the first gear, and will not be described here in detail.

The reverse output gear 39 is fixedly arranged on the second output shaft 22, so that when the transmission is in a fifth gear, a sixth gear and a seventh gear, part of the power of the engine 4 can be transferred to the first electric generator 51 through the second output shaft 22, the reverse output gear 39, the second transmission gear 512, and the first transmission gear 511, and at this point, the first electric generator 51 is used as a generator.

A pure-electric mode: the first electric generator 51 is used as a motor, and the power of the first electric generator 51 is transferred to the wheel through the first transmission gear 511, the second transmission gear 512, the reverse output gear 39, the second output shaft 22, the second-output-shaft output gear 221, and the differential power input gear 7 in sequence so as to drive the vehicle to move.

An energy recovery mode: energy transferred from the wheel is transferred to the first electric generator 51 through the differential power input gear 7, the second-output-shaft output gear 221, the second output shaft 22, the reverse output gear 39, the second transmission gear 512, and the first transmission gear 511 in sequence, and at this point, the first electric generator 51 is used as a generator.

Working modes of the power drive system 100 according to the embodiments of the present disclosure are described below in detail by taking the power drive system 100 shown in FIG. 3 as an example.

A parking electricity generation mode: the input end 23*d* of the dual clutch 2*d* is disengaged from the first output end 21*d* and the second output end 22*d* respectively, the power of the engine 4 is transferred to the second electric generator 52 through the input end 23*d*, and the second electric generator 52 is used as a generator.

A pure-engine mode: the transmission has seven forward gears, detailed description is made below by taking the first gear as an example, the input end 23*d* of the dual clutch 2*d* is connected with the first output end 21*d*, the first- and third-gear synchronizer 13*c* engages the first-gear driven gear 1*b* with the first output shaft 21, and the power of the engine 4 is transferred to the wheel through the first-gear driving gear 1*a*, the first-gear driven gear 1*b*, the first- and third-gear synchronizer 13*c*, the first output shaft 21, the first-output-shaft output gear 211, and the differential power input gear 7 in sequence so as to drive the vehicle to move. Other gear transfer processes are similar to that of the first gear, and will not be described here in detail.

The reverse output gear 39 is fixedly arranged on the second output shaft 22, so that when the transmission is in the fifth gear, the sixth gear and the seventh gear, part of the power of the engine 4 can be transferred to the first electric generator 51 through the second output shaft 22, the reverse output gear 39, the second transmission gear 512, and the first transmission gear 511, and at this point, the first electric generator 51 is used as a generator. Additionally, another part of the power of the engine 4 may also drive the second electric generator 52 to generate electricity.

Pure-electric mode one: the first electric generator 51 is used as a motor, and the power of the first electric generator 51 is transferred to the wheel through the first transmission gear 511, the second transmission gear 512, the reverse output gear 39, the second output shaft 22, the second-output-shaft output gear 221, and the differential power input gear 7 in sequence so as to drive the vehicle to move.

Pure-electric mode two: the second electric generator 52 is used as a motor, detailed description is made below by taking the first gear as an example, the input end 23*d* of the dual clutch 2*d* is connected with the first output end 21*d*, the first- and third-gear synchronizer 13*c* engages the first-gear driven gear 1*b* with the first output shaft 21, and power of the second electric generator 52 is transferred to the wheel through the first-gear driving gear 1*a*, the first-gear driven gear 1*b*, the first- and third-gear synchronizer 13*c*, the first output shaft 21, the first-output-shaft output gear 211, and the differential power input gear 7 in sequence so as to drive the vehicle to move. Other gear transfer processes are similar to that of the first gear, and will not be described here in detail. In this process, the engine 4 may be idle.

Pure-electric mode three: the first electric generator 51 and the second electric generator 52 are used as motors simultaneously, and the power of the first electric generator 51 and the power of the second electric generator 52 are coupled at the differential power input gear 7 and then transferred to the wheel to drive the vehicle to move.

An energy recovery mode: energy transferred from the wheel is transferred to the first electric generator 51 through the differential power input gear 7, the second-output-shaft output gear 221, the second output shaft 22, the reverse output gear 39, the second transmission gear 512, and the first transmission gear 511 in sequence, and at this point, the first electric generator 51 is used as a generator.

Working modes of the power drive system 100 according to the embodiments of the present disclosure are described below in detail by taking the power drive system 100 shown in FIG. 4 as an example.

A parking electricity generation mode: the input end 23*d* of the dual clutch 2*d* is disengaged from the first output end 21*d* and the second output end 22*d* respectively, the power of the engine 4 is transferred to the second electric generator 52 through the input end 23*d*, and the second electric generator 52 is used as a generator.

A pure-engine mode: the transmission has seven forward gears, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the engine 4 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail. It should be explained that since the first electric generator 51 is linked with the reverse shaft 3, when the vehicle is in the reverse gear, the first electric generator 51 may be used as a generator so as to generate electricity. Additionally, part of the power of the engine 4 is used to drive the second electric generator 52 to generate electricity.

Pure-electric mode one: the first electric generator 51 is used as a motor, and the power of the first electric generator 51 is transferred to the wheel through the first transmission gear 511, the second transmission gear 512, the first motor gear 33, the reverse shaft 3, second gear for the reverse shaft 32, the reverse output gear 39, the second output shaft 22, the second-output-shaft output gear 221, and the differential power input gear 7 in sequence so as to drive the vehicle to move.

Pure-electric mode two: the second electric generator 52 is used as a motor, detailed description is made below by taking the first gear as an example, the input end 23d of the dual clutch 2d is connected with the first output end 21d, the first- and third-gear synchronizer 13c is engaged with the first-gear driven gear 1b and the first output shaft 21, and the power of the second electric generator 52 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail.

Pure-electric mode three: the first electric generator 51 and the second electric generator 52 are used as motors simultaneously, and the power of the first electric generator 51 and the power of the second electric generator 52 are coupled at the differential power input gear 7 and then transferred to the wheel to drive the vehicle to move.

An energy recovery mode: energy transferred from the wheel is transferred to the first electric generator 51 through the differential power input gear 7, the second-output-shaft output gear 221, the second output shaft 22, the reverse output gear 39, the second transmission gear 512, and the first transmission gear 511 in sequence, and at this point, the first electric generator 51 is used as a generator.

Working modes of the power drive system 100 according to the embodiments of the present disclosure are described below in detail by taking the power drive system 100 shown in FIG. 5 as an example.

A parking electricity generation mode: the input end 23d of the dual clutch 2d is disengaged from the first output end 21d and the second output end 22d respectively, the power of the engine 4 is transferred to the second electric generator 52 through the input end 23d, and the second electric generator 52 is used as a generator.

A pure-engine mode: the transmission has seven forward gears, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the engine 4 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail. Additionally, part of the power of the engine 4 is used to drive the second electric generator 52 to generate electricity.

Pure-electric mode one: the first electric generator 51 is used as a motor, and the power of the first electric generator 51 is transferred to the wheel through the first transmission gear 511, the second transmission gear 512, the third transmission gear 513, the fourth transmission gear 514, and the differential power input gear 7 in sequence so as to drive the vehicle to move.

Pure-electric mode two: the second electric generator 52 is used as a motor, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the second electric generator 52 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail.

Pure-electric mode three: the first electric generator 51 and the second electric generator 52 are used as motors simultaneously, and the power of the first electric generator 51 and the power of the second electric generator 52 are coupled at the differential power input gear 7 and then transferred to the wheel to drive the vehicle to move.

An energy recovery mode: the power transferred from the wheel is transferred to the first electric generator 51 through the differential power input gear 7, the fourth transmission gear 514, the third transmission gear 513, the second transmission gear 512, and the first transmission gear 511 in sequence, and at this point, the first electric generator 51 is used as a generator.

Working modes of the power drive system 100 according to the embodiments of the present disclosure are described below in detail by taking the power drive system 100 shown in FIG. 6 as an example.

A parking electricity generation mode: the input end 23d of the dual clutch 2d is disengaged from the first output end 21d and the second output end 22d respectively, the power of the engine 4 is transferred to the second electric generator 52 through the input end 23d, and the second electric generator 52 is used as a generator.

A pure-engine mode: the transmission has seven forward gears, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the engine 4 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail. Additionally, part of the power of the engine 4 is used to drive the second electric generator 52 to generate electricity. It should be explained that since the first electric generator 51 is connected with the second output shaft 22, when gears of the transmission are the fifth gear, the sixth gear, and the seventh gear, the first electric generator 51 is used as a generator.

Pure-electric mode one: the first electric generator 51 is used as a motor, and the power of the first electric generator 51 is transferred to the wheel through the second output shaft 22, the second-output-shaft output gear 221, and the differential power input gear 7 in sequence so as to drive the vehicle to move.

Pure-electric mode two: the second electric generator 52 is used as a motor, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the second electric generator 52 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail.

Pure-electric mode three: the first electric generator 51 and the second electric generator 52 are used as motors simultaneously, and the power of the first electric generator 51 and the power of the second electric generator 52 are coupled at the differential power input gear 7 and then transferred to the wheel to drive the vehicle to move.

An energy recovery mode: the power transferred from the wheel is transferred to the first electric generator 51 through the differential power input gear 7, the second-output-shaft output gear 221, and the second output shaft 22 in sequence, and the first electric generator 51 is used as a generator.

Working modes of the power drive system 100 according to the embodiments of the present disclosure are described below in detail by taking the power drive system 100 shown in FIG. 7 as an example.

A parking electricity generation mode: the input end 23d of the dual clutch 2d is disengaged from the first output end 21d and the second output end 22d respectively, the power of the engine 4 is transferred to the second electric generator 52 through the input end 23d, and the second electric generator 52 is used as a generator.

A pure-engine mode: the transmission has seven forward gears, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the engine 4 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail. Additionally, part of the power of the engine 4 is used to drive the second electric generator 52 to generate electricity. It should be explained that since the first electric generator 51 is connected with the first output shaft 21, when the gears of the transmission are a first gear, a second gear, a third gear, and a fourth gear, the first electric generator 51 is used as a generator.

Pure-electric mode one: the first electric generator 51 is used as a motor, and the power of the first electric generator 51 is transferred to the wheel through the first output shaft 21, the first-output-shaft output gear 211, and the differential power input gear 7 in sequence so as to drive the vehicle to move.

Pure-electric mode two: the second electric generator 52 is used as a motor, detailed description is made below by taking the first gear as an example, the input end 23d of the dual clutch 2d is connected with the first output end 21d, the first- and third-gear synchronizer 13c engages the first-gear driven gear 1b with the first output shaft 21, and the power of the second electric generator 52 is transferred to the wheel through the first-gear driving gear 1a, the first-gear driven gear 1b, the first- and third-gear synchronizer 13c, the first output shaft 21, the first-output-shaft output gear 211, and the differential power input gear 7 in sequence so as to drive the vehicle to move. Other gear transfer processes are similar to that of the first gear, and will not be described here in detail.

Pure-electric mode three: the first electric generator 51 and the second electric generator 52 are used as motors simultaneously, and the power of the first electric generator 51 and the power of the second electric generator 52 are coupled at the differential power input gear 7 and then transferred to the wheel to drive the vehicle to move.

An energy recovery mode: the power transferred from the wheel is transferred to the first electric generator 51 through the differential power input gear 7, the first-output-shaft output gear 211, and the first output shaft 21 in sequence, and the first electric generator 51 is used as a generator.

In the power drive system 100 according to the present disclosure, since the first electric generator 51 is linked with the differential power input gear 7, the first electric generator 51 has very high transmission efficiency, and this may avoid the problem that a pure-electric mode may be achieved only by complex gear shift and transmission chains in a transmission in a traditional power drive system 100, so that the pure-electric mode has less components required for transmission, with reliable transmission processes and high transmission efficiency.

Additionally, for control logics, a control logic of the engine 4 and a control logic of the first electric generator 51 are independent of each other, which may save the time and cost of development for manufacturers and avoid higher malfunction rates of the power drive system 100.

Furthermore, a vehicle including the power drive system 100 as described above is further provided according to the embodiments of the present disclosure. It should be noted that other components of the vehicle according this embodiment of the present disclosure such as a driving system, a steering system, and a braking system are all existing technologies well known to a person of ordinary skill in the art, and therefore detailed descriptions of such known structures are omitted herein.

In the descriptions of this specification, descriptions of reference terms "one embodiment", "some embodiments", "an example", "a specific example", or "some examples" are intended to indicate that particular features, structures, materials, or characteristics described with reference to the embodiment or example are included in at least one embodiment or example of the present disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A power drive system for a vehicle, comprising:
   an engine;
   a plurality of input shafts, the engine being configured to be selectively engaged with at least one of the plurality of input shafts each provided with a gear driving gear;
   a plurality of output shafts each provided with a gear driven gear, a plurality of gear driven gears being meshed with a plurality of gear driving gears correspondingly;
   a reverse shaft provided with a first gear for the reverse shaft, the first gear for the reverse shaft being meshed with one of the gear driving gears;
   a reverse output gear linked with the reverse shaft;
   a first electric generator, the first electric generator and the plurality of output shafts linked with a differential power input gear of the vehicle respectively;
   a second electric generator configured to be linked with the engine; and
   a dual clutch having an input end, a first output end, and a second output end, wherein the input end is selectively engaged with at least one of the first output end and the second output end, the engine is connected with the input end, the input end is provided with external teeth, and the dual clutch is linked with the second electric generator via the external teeth.

2. The power drive system for a vehicle according to claim 1, wherein the first gear for the reverse shaft is sheathed on the reverse shaft.

3. The power drive system for a vehicle according to claim 2, further comprises: further comprising: a first synchronizer for the reverse shaft configured to engage the reverse shaft with the first gear for the reverse shaft.

4. The power drive system for a vehicle according to claim 2, wherein the reverse output gear is fixed on one of the plurality of output shafts.

5. The power drive system for a vehicle according to claim 4, wherein the first electric generator is configured to be linked with the differential power input gear by being linked with the reverse output gear.

6. The power drive system for a vehicle according to claim 2, wherein the reverse shaft is fixedly provided with a first motor gear, and the first motor gear is linked with the first electric generator.

7. The power drive system for a vehicle according to claim 1, wherein the first gear for the reverse shaft is fixed on the reverse shaft.

8. The power drive system for a vehicle according to claim 7, wherein the reverse output gear is sheathed on one of the plurality of output shafts and the reverse output gear is configured to be engageable with the one of the plurality of output shafts.

9. The power drive system for a vehicle according to claim 8, further comprising: a reverse-gear synchronizer configured to engage the reverse output gear with the one of the plurality of output shafts.

10. The power drive system for a vehicle according to claim 9, wherein the reverse output gear shares the reverse-gear synchronizer with an adjacent gear driven gear.

11. The power drive system for a vehicle according to claim 1, wherein the reverse shaft is fixedly provided with a second gear for the reverse shaft, and the second gear for the reverse shaft is meshed with the reverse output gear.

12. The power drive system for a vehicle according to claim 1, wherein
    the plurality of input shafts comprises: a first input shaft and a second input shaft sheathed on the first input shaft, the first input shaft being connected with the first output end, and the second input shaft being connected with the second output end; and
    the plurality of output shafts comprises: a first output shaft and a second output shaft.

13. The power drive system for a vehicle according to claim 12, wherein
    the first input shaft is fixedly provided with a first-gear driving gear, a third-gear driving gear, a fifth-gear driving gear, and a seventh-gear driving gear, and the second input shaft is fixedly provided with a second-gear driving gear a fourth-gear driving gear, and a sixth-gear driving gear;
    the first output shaft is sheathed with a first-gear driven gear, a second-gear driven gear, a third-gear driven gear, and a fourth-gear driven gear;
    the second output shaft is sheathed with a fifth-gear driven gear, a sixth-gear driven gear, and a seventh-gear driven gear; and
    the first output shaft is provided with a first-gear synchronizer and a third-gear synchronizer located between the first-gear driven gear and the third-gear driven gear, the first output shaft is also provided with a second-gear synchronizer and a fourth-gear synchronizer located between the second-gear driven gear and the fourth-gear driven gear, the second output shaft is provided with a fifth-gear synchronizer and a seventh-gear synchronizer located between the fifth-gear driven gear and the seventh-gear driven gear, and the second output shaft is also provided with a sixth-gear synchronizer located on one side of the sixth-gear driven gear.

14. The power drive system for a vehicle according to claim 13, wherein the first gear for the reverse shaft is meshed with the first-gear driving gear.

15. The power drive system for a vehicle according to claim 13, wherein
    the reverse output gear is fixedly arranged on the second output shaft; and
    the first gear for the reverse shaft is sheathed on the reverse shaft, and the reverse shaft is provided with the first synchronizer for the reverse shaft that is used to be engaged with the first gear for the reverse shaft, wherein
    the first synchronizer for the reverse shaft shares a same shifting yoke mechanism with the sixth-gear synchronizer, the sixth-gear synchronizer is separated from the sixth-gear driven gear when the shifting yoke mechanism drives the first synchronizer for the reverse shaft to be engaged with the first gear for the reverse shaft, and the first synchronizer for the reverse shaft is separated from the first gear for the reverse shaft when the shifting yoke mechanism drives the sixth-gear synchronizer to be engaged with the sixth-gear driven gear.

16. The power drive system for a vehicle according to claim 13, wherein the first gear for the reverse shaft is fixed on the reverse shaft; and the reverse output gear is sheathed on the second output shaft and adjacent to the sixth-gear driven gear, and the reverse output gear shares the sixth-gear synchronizer with the sixth-gear driven gear.

17. The power drive system for a vehicle according to claim 12, wherein the first output shaft is fixedly provided with a first-output-shaft output gear, the second output shaft is fixedly provided with a second-output-shaft output gear, and the first-output-shaft output gear and the second-output-shaft output gear are meshed with the differential power input gear of the vehicle respectively.

\* \* \* \* \*